United States Patent [19]

Ståhl

[11] Patent Number: 5,759,597
[45] Date of Patent: Jun. 2, 1998

[54] FILLING AGENT

[75] Inventor: Åke Ståhl, Sösdala, Sweden

[73] Assignee: Sveriges Stärkelseproducenter, Förening UPA, Karlshamn, Sweden

[21] Appl. No.: 793,347

[22] PCT Filed: Jul. 1, 1996

[86] PCT No.: PCT/SE96/00872

§ 371 Date: Feb. 24, 1997

§ 102(e) Date: Feb. 24, 1997

[87] PCT Pub. No.: WO97/03573

PCT Pub. Date: Feb. 6, 1997

[51] Int. Cl.[6] .................... C12Q 1/40; C07G 17/00; C08B 30/04

[52] U.S. Cl. .................. 426/48; 435/22; 435/267; 435/275; 536/2; 536/102; 536/45; 536/124; 536/128

[58] Field of Search ................. 426/48; 536/45, 536/102, 124, 128, 2; 436/8, 17, 18, 20; 435/22, 267, 275

[56] References Cited

FOREIGN PATENT DOCUMENTS

92/11376  7/1992  WIPO.

OTHER PUBLICATIONS

Derwent Abstract 000851368 (1972). Month not available.

*Primary Examiner*—Louise Leary
*Attorney, Agent, or Firm*—Beveridge, DeGrandi, Weilacher & Young, LLP

[57] ABSTRACT

The use of amylopectin-type starch obtained from potato that has been modified by genetic engineering to suppress the formation of amylose-type starch as a filling agent in the preservation of food-stuff, is described.

20 Claims, No Drawings

FILLING AGENT

The present invention relates to the use of amylopectin-type starch or derivatives thereof as a filling agent in the preservation of food-stuffs.

More precisely, the present invention relates to the use of amylopectin-type starch obtained from potato that has been modified by genetical engineering, to suppress the formation of amylose-type starch.

BACKGROUND OF THE INVENTION

In the process of autoclaving and sterilisation of food-stuff containing solid pieces, a certain filling viscosity is required while the tin is being filled and conveyed on the belt conveyor, since it has been found that the liquid fraction of the tin contents easily splashes over the tin rim. Another reason for a certain viscosity being desirable in the product is that it furthers an equal distribution of the solid pieces in the food-stuff mass. This feature is also important as products containing solid pieces are sterilised in a continuous process, for instance in the case of soups, which are packed in an aseptic condition in the final packaging stage. Considering that the mass to be preserved often is in a hot condition during the filling stage, the operators concerned are exposed to scalding hazards from splash and slosh if the product is too thin during this stage.

Earlier on, this problem was solved by addition of traditional starch but the results were not satisfactory, because it produced an unwanted residual viscosity in the tin. Previously, naturally occurring potato flour, naturally occurring waxy maize starch, and waxy maize starch to which isoascorbic acid or ascorbic acid had been added (to eliminate the residual viscosity in naturally occurring maize starch) were used within the canned goods industry to obtain the desired function. However, it has been found that none of these additions produced a satisfactory result. Naturally occurring potato flour produces residual viscosity and clouding, for instance during storage of clear liquids such as brine, in preserved vegetables, but also causes the product to thicken during storage. Naturally occurring waxy maize starch produces a certain residual viscosity but also some clouding of the solution. Although the addition of isoascorbic acid or ascorbic acid increases the clearness of the product, residual viscosity is generated to varying degrees as the acids are degraded by organic matter originating from other ingredients in the preserved product. Thus, problems arise in connection with the preservation, both on account of the undesired residual viscosity and of the clouding of the product, and it is desired within the canned goods industry that these problems be removed.

OBJECT OF THE INVENTION

The object of the present invention is to eliminate the above-mentioned problems and provide a preservation method ensuring low residual viscosity and clearness in the product. This object is achieved by using amylopectin-type starch of the kind defined in the introduction, which starch additionally possesses the characteristics defined in the appended claims.

SUMMARY OF THE INVENTION

In accordance with the present invention amylopectin-type of starch or derivatives thereof thus is used as a filling agent in the preservation of food-stuff.

The expression "amylopectin-type starch" as used throughout in the present description relates to starch obtained from potato that has been modified by genetical engineering to suppress the formation of amylose-type starch. The expression "derivatives thereof" relates to amylopectin-type starch that has been chemically, physically and/or enzymatically derivatised. The amylopectin contents of amylopectin-type starch are in excess of 95%, preferably in excess of 98%. The remaining ingredient in amylopectin-type starch is amylose.

For a detailed description of the above amylopectin-type starch and derivatives thereof and the manner in which they are produced reference is made to the Swedish Patent Specification 9004096-5 (Amylogene HB).

Naturally occurring potato starch contains about 80% amylopectin and about 20% amylose. The starch is contained in small grains, also denominated granules. When water and heat are added, the granules swell, with the result that the viscosity increases and amylose leaks from the granules. When the amylose contents in the starch have been reduced to a low level, the starch granule becomes very fragile and easily breaks when boiled. This means that amylopectin-type starch used as a filling agent in the initial filling and conveyor transportation of the tin possesses a sufficiently high degree of viscosity to meet the requirements at this stage of the preservation process, but that as a result of the subsequent heat treatment this viscosity drops to a desired residual viscosity level upon completion of the process cycle. This means that no supplementary addition of viscosity-reducing acids need to be made, which otherwise is common practise. Since potato-derived starch has very low contents of residual protein and residual fat, there is not either any tendencies of cloudiness, which would otherwise be the case, were for instance waxy maize starch to be used. The reason therefor is the extremely low contents of amylose in amylopectin-type starch. Otherwise, the cloudiness is related to the instability of amylose in solution.

By using amylopectin-type starch as a filling agent in the preservation of food-stuff the earlier encountered problem with too high residual viscosity levels and cloudy products thus has been eliminated. A further advantage offered by the present invention is the prolongation of the storage life of the preserved product.

The example below aims at describing the present invention in more detail.

EXAMPLE

A liquid to be preserved is heated to 70°–80° C. The amylopectin-type starch used as a filling agent is formed into a slurry in twice the amount by weight of a cold liquid, such as water, whereafter it was admixed with the heated liquid while being stirred. After a brief period of time the starch has swelled and the desired viscosity is attained. The preparation is then ready to serve as a filling agent or to be subjected to further processing. To attain the desired viscosity a dosage of 0.5–3.5% by weight of the amylopectin-type starch, calculated on the total amount of liquid, is required. Upon continued maintenance of the temperature level, the amylopectin readily degrades, leading to decreasing viscosity. In this manner, a desired low level of residual viscosity is obtained in the product.

It is not previously known to use amylopectin-type starch as defined above as a filling agent in the preservation of food-stuff, and practical tests have shown the surprising combined effects of reduced residual viscosity, increased clearness in the product, and prolonged storage life.

I claim:

1. A method of processing a food-stuff comprising the steps of:

adding amylopectin-type starch obtained from a genetically modified potato to the food-stuff.

2. The method of claim 1 wherein the amylopectin-type starch contains more than 95% amylopectin.

3. The method of claim 1 wherein the amylopectin-type starch contains more than 98% amylopectin.

4. The method of claim 1 wherein the amylopectin-type starch has been chemically, physically or enzymatically derivatized.

5. The method of claim 1 wherein the amylopectin-type starch is added in an amount of 0.5–3.5% by weight.

6. The method of claim 3 wherein the amylopectin-type starch is added in an amount of 0.5–3.5% by weight.

7. The method of claim 4 wherein the amylopectin-type starch is added in an amount of 0.5–3.5% by weight.

8. A method of controlling the viscosity of a food-stuff comprising the steps of:

adding amylopectin-type starch obtained from a genetically modified potato to the food-stuff, and optionally heating the food-stuff to obtain a desired residual viscosity.

9. The method of claim 8 wherein the amylopectin-type starch contains more than 95% amylopectin.

10. The method of claim 8 wherein the amylopectin-type starch contains more than 98% amylopectin.

11. The method of claim 8 wherein the amylopectin-type starch has been chemically, physically or enzymatically derivatized.

12. The method of claim 8 wherein the amylopectin-type starch is added in an amount of 0.5–3.5% by weight.

13. The method of claim 10 wherein the amylopectin-type starch is added in an amount of 0.5–3.5% by weight.

14. The method of claim 11 wherein the amylopectin-type starch is added in an amount of 0.5–3.5% by weight.

15. A method of preserving a food-stuff comprising the steps of:

adding amylopectin-type starch obtained from a genetically modified potato to the food-stuff, and heating the food-stuff.

16. The method of claim 15 wherein the amylopectin-type starch contains more than 95% amylopectin.

17. The method of claim 15 wherein the amylopectin-type starch contains more than 98% amylopectin.

18. The method of claim 15 wherein the amylopectin-type starch has been chemically, physically or enzymatically derivatized.

19. The method of claim 15 wherein the amylopectin-type starch is added in an amount of 0.5–3.5% by weight.

20. The method of claim 18 wherein the amylopectin-type starch is added in an amount of 0.5–3.5% by weight.

* * * * *